Feb. 25, 1947.   H. WILSON ET AL   2,416,602
HARNESS FOR PARACHUTE DELIVERY OF AMMUNITION BOXES
Filed Nov. 27, 1942
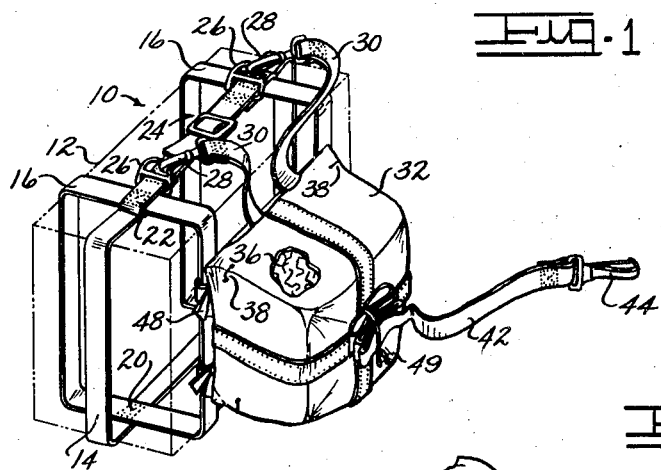
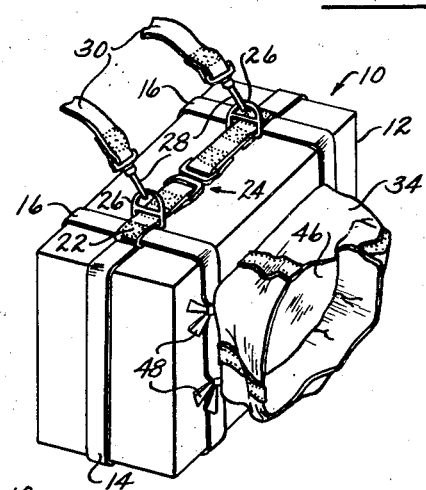
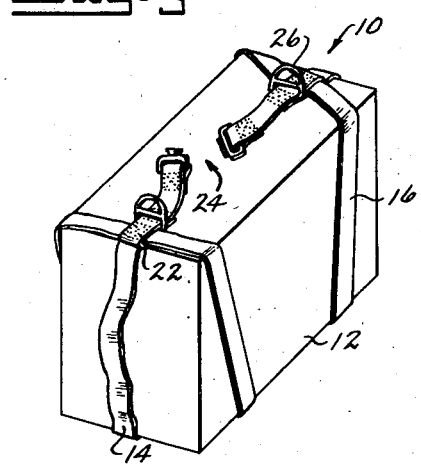
INVENTORS
HARRY WILSON
WILLIAM P. YARBOROUGH Patented Feb. 25, 1947

2,416,602

UNITED STATES PATENT OFFICE 2,416,602

HARNESS FOR PARACHUTE DELIVERY OF AMMUNITION BOXES

Harry Wilson, Dayton, Ohio, and William P. Yarborough, Staunton, Va.

Application November 27, 1942, Serial No. 467,160

1 Claim. (Cl. 190—27)

(Granted under the act of March 3, 1883, as amended April 30, 1928; 370 O. G. 757)

The invention described herein may be manufactured and used by or for the Government for governmental purposes, without payment to us of any royalty thereon.

This invention relates to apparatus for the delivery of ammunition boxes from aircraft by parachute, and specifically to a quickly removable sling, or harness for supporting the box on the parachute during delivery.

Resort is usually had to this method of delivery to ground troops only under extreme necessity as where a number of troops are isolated from the main lines and are under enemy fire, in which case it is desirable that they be exposed for a minimum period of time in opening the box.

It is therefore an object of the invention to provide a device of this kind which is simple and effective and of low cost and which may be opened and removed from the box in the shortest possible time and with the least possible effort.

Other objects and advantages will be recognized upon consideration of the description and drawing, in which Figure 1 is a phantom perspective view of an ammunition box supported in our improved harness with a parachute pack connected to the harness all ready for aerial delivery.

Figure 2 is a perspective view of the apparatus shown in Figure 1 after delivery and before removing the harness from the box.

Figure 3 is a perspective view of the apparatus after the single coupling is undone and the harness is partly removed.

Like reference characters are employed to designate like parts throughout the drawing.

Referring to the drawing, the harness 10 which engirds the box 12 is made up of one long strap 14, preferably of strong cotton webbing or flat wire rope which passes endwise around the box, and two shorter straps 16 preferably of the same material which surround the box crosswise near the ends.

The shorter straps 16 are brought to a proper size to surround the box, but not too tightly and are then stitched to this size so as to form endless belts around the box. These endless belts are purposely without adjustment for size, the size to which they are permanently stitched being as shown in Fig. 3, where the bottom portion which crosses underneath the box may remain in the working position, while the top portion which crosses the top of the box may be stripped off the end of the box as shown. They are further permanently stitched to the long strap where they cross it both on the underside at 20, and on the upper side at 22. The size to which the endless belts are permanently stitched and the distance from the end of the box at which they are stitched to the long strap are important features of the invention.

Intermediate the crossover 22, preferably about midway therebetween, the ends of the long strap 14 are brought together and each end provided with one member of a quick-action coupling 24. The long strap 14 should encircle the box 12 with just enough freedom to allow the coupling 24, Fig. 2, to be undone as in Fig. 3, and there should be no means of adjusting the length of the strap. This is also an important feature of the invention.

Stitched into the webbing, at the cross-over positions 22, are two D rings 26 into which the spring snaps 28 of the parachute risers 30 are hooked. The parachute pack, shown closed in Figure 1, comprises an outer cover 32, Fig. 1, which telescopes over an inner cover 34, Figure 2, to enclose the canopy 36, the telescoping covers being tacked together at several spots by light break threads 38, and the top of the canopy also being fastened by the usual break cord (not shown) to the inside of the outer cover 32. A static line 42 has one end attached to the outside of the outer cover 32 and a snap fastener 44 for securing the other end to an anchor on the aircraft. The risers 30 enter the pack between the telescoped walls of the inner and outer covers 34 and 32 as shown, and are attached in the usual manner to the shroud lines of the canopy. A stiffening board 46 is built into the bottom of the inner cover 34 and strips 48 of narrow webbing on the edges of this board are tied around the short strips 16 for holding the pack and the harness together until delivery is effected. The static line is laid in a series of loops and tied with a break thread 49 pending the launching of the apparatus.

In employing our improved apparatus for aerial delivery, the device is packed and arranged as in Figure 1 and stored in the aircraft. When the objective is reached, the snap fastener 44 is attached to the anchor on the aircraft and the device is dropped. The thread 49 first breaks, allowing the loops of the static line to be undone until the static line tautens and breaks the threads 38, whereupon the outer cover 32 is drawn from the inner cover 34. Further dropping of the box 12 straightens out the canopy 36 and breaks the break cord (not shown), which severs the top of the canopy from the inside of the top cover 32. The canopy now opens and retards the fall of the box 12 to bring it within safe landing limits.

Upon landing, the parachute and cargo appear as in Figure 2. The recipient may open the box, which is generally provided with a hinged lid, by undoing the quick-action coupling 24, pulling the loose ends of the two upper bow ties and stripping the straps 16 off the ends of the box as shown in Figure 3, after which the box may be opened. If conditions permit, the parachute canopy may be salvaged by unhooking the spring snaps 28 from the D rings 26.

It will now be apparent that, if there was any adjustment to the endless belts 16, the party preparing the device would almost surely adjust it too tightly to permit stripping the belts over the end of the box as in Fig. 3. Moreover, if the points of stitching 20, 22, were too far from the end of the box, the belts could not be stripped off as in Fig. 3. Still further, if the strap 14 were provided with means to adjust its length, it would likely be adjusted too close to permit undoing of the coupling 24 without some delay. The essence of the invention resides in the non-adjustable endless belts 16 made just large enough and stitched top and bottom just far enough from the ends of the box to permit stripping off as in Fig. 3, and the non-adjustable strap 14 made just long enough to allow freedom of undoing of the coupling 24, Fig. 3, without delay.

Having described our invention, we claim:

Apparatus for parachute delivery of ammunition boxes, which comprises a harness consisting of two endless belts loosely surrounding the box crosswise of its length and at predetermined distances from its ends, and a single non-adjustable strap surrounding the box lengthwise midway of its width, the two ends of the strap being brought together intermediate the said endless belts and provided at each of the ends with a part of a quick-acting fastener, the belts and the strap being permanently stitched together where they cross both on the top and on the bottom of the box, the effective length of the belts being slightly greater than the periphery of the box and their distances from the ends of the box at which they are stitched being such that, when the coupling is undone, the portion of the belts which cross the top of the box may be stripped over the ends of the box, while the portions which cross the bottom of the box remain in their working position.

HARRY WILSON.
WILLIAM P. YARBOROUGH.

REFERENCES CITED

The following references are of record in the file of this patent:

UNITED STATES PATENTS

| Number | Name | Date |
| --- | --- | --- |
| 1,944,801 | Nichols | Nov. 7, 1929 |
| 618,333 | Colteryahn | Jan. 24, 1899 |
| 544,070 | Phelan | Aug. 6, 1895 |
| 548,270 | Pitner | Oct. 22, 1895 |
| 902,695 | Staley | Nov. 3, 1908 |